No. 766,245. PATENTED AUG. 2, 1904.
F. HARDINGE.
GEAR CUTTING AND MILLING MACHINE.
APPLICATION FILED JAN. 20, 1902.
NO MODEL. 6 SHEETS—SHEET 1.

Fig. 1.

Witnesses:
Lynn A. Williams
May W. Label

Inventor:
Franklin Hardinge,
By Charles A. Brown Cragg & Belfield
Attorneys.

No. 766,245. PATENTED AUG. 2, 1904.
F. HARDINGE.
GEAR CUTTING AND MILLING MACHINE.
APPLICATION FILED JAN. 20, 1902.
NO MODEL. 6 SHEETS—SHEET 3.

Fig. 3.

WITNESSES:
Geo. M. Mayer
Herbert F. Obergfell

INVENTOR
FRANKLIN HARDINGE,
By Charles A. Brown, Cragg & Belfield
ATTORNEYS.

No. 766,245. PATENTED AUG. 2, 1904.
F. HARDINGE.
GEAR CUTTING AND MILLING MACHINE.
APPLICATION FILED JAN. 20, 1902.
NO MODEL. 6 SHEETS—SHEET 5.

Witnesses:
Lynn A. Williams
Max W. Zabel

Inventor:
Franklin Hardinge,
By Charles A. Brown Cragg & Belfield
Attorneys.

No. 766,245.　　　　　　　　　　　　　　　　　　　　Patented August 2, 1904.

UNITED STATES PATENT OFFICE.

FRANKLIN HARDINGE, OF CHICAGO, ILLINOIS.

GEAR CUTTING AND MILLING MACHINE.

SPECIFICATION forming part of Letters Patent No. 766,245, dated August 2, 1904.

Application filed January 20, 1902. Serial No. 90,527. (No model.)

*To all whom it may concern:*

Be it known that I, FRANKLIN HARDINGE, a citizen of the United States, residing at Chicago, in the county of Cook and State of Illinois, have invented a certain new and useful Improvement in Gear Cutting and Milling Machines, of which the following is a full, clear, concise, and exact description, reference being had to the accompanying drawings, forming a part of this specification.

My invention relates to automatic machinery, and has for its object the provision of an improved machine whereby a plurality of preferably similar operations may be successively performed either upon a single blank suitably movable for this purpose or upon a plurality of blanks each brought automatically under the influence of the operating portions of the machine.

More particularly my invention contemplates in one embodiment thereof the provision of a machine wherein an operating-tool may be periodically brought into operative association with blank material to operate upon the same.

My invention is adapted for a plurality of uses, among which may be classed the operation of automatically cutting gear-teeth upon gear-blanks and the slotting of screw-heads.

In the preferred embodiment of the invention stock or blank material is suitably moved within the machine-frame, whereafter the tool or cutting appliance of the machine is periodically brought into engagement with said blank material to operate upon the same.

By means of my invention tools of a variety of shapes may be employed to effect a working of the blank material.

Generally speaking, in the preferred embodiment of my invention I employ suitable framework wherein the stock may be mounted, such framework being so adjustably constructed as to be preferably rotatable about an axis. I arrange in close proximity to the said framework carrying the blank material an operating-shaft, upon which a suitable cutting-tool may be mounted, which cutting-tool may be periodically brought into engagement with said blank material to operate upon the same—as, for instance, to cut a groove in the said blank material. The cutting-tool having completed one operation, the framework carrying the blank material may be thereafter preferably rotated a short distance to bring another portion of the said blank material within the range of the said tool, when the said tool is again moved to bring it into operative association with said blank material. I prefer to have the mounting for the framework carrying the blank material fixedly secured in a longitudinally-movable casing or work-holder and to movably mount the operating-tool of the machine so as to cause a periodic movement thereof into engagement with the said blank material. I prefer to employ a slotted crank-disk fixedly secured to an operating-shaft and to interpose between said crank-disk and said reciprocatory work-holder a connecting-rod having pivotal connection with the said reciprocatory work-holder and adjustable connection with the slotted crank-disk, thereby to change the amount of movement or throw of said reciprocatory work-holder. The said reciprocatory work-holder carrying the blank material is thus operated to and fro when the driving-shaft is rotated, and thereby carries the blank material either across the path or directly within the range of the cutting-tool, whereby an operation of the desired character may be performed upon the said blank material. I provide means in association with said driving-shaft comprising in one embodiment a cam and an actuating-surface engaged thereby, which means serve periodically to raise the cutting or operating tool to bring the same into engagement with the blank material to be operated upon.

I provide means in association with the reciprocatory work-holder for carrying the stock or blank material, which means are adapted to actuate the rotatably-mounted stock so as to cause said stock upon each reciprocation of said work-holder to present a different portion of its surface under the influence of said operating-tool. I provide additional means controlled by the reciprocatory work-holder, which additional means serve to lock the mounting for the rotatable stock preferably in a given position, so as to prevent rotation thereof during the operation of the tool.

My invention further contemplates the provision of improved means whereby blank material may be securely held in the machine, the said means being adapted to prevent material displacement of the said blank stock, thus to insure accuracy in the manufacture of the articles under construction. I also preferably construct the various component parts of my improved machine in such manner that they may be readily adjusted and changed to accommodate stock of various sizes and shapes or to cause the same to be operated upon by tools of different character.

It is one of the features of my invention that the rapidly-moving parts, such as the mechanism with which the rotating milling-cutter is directly associated, are maintained in continuous operation.

As distinguished from the machines of the prior art the cutter-driving mechanism of my improved machine is maintained continuously in motion while an operator changes the finished gears for gear-blanks which are to be operated upon.

In connection with my invention I provide automatic stopping mechanism for causing a discontinuance of the feed and reciprocation of the gear-blanks when such blanks have had the required number of teeth cut in their periphery.

In the accompanying drawings.

Like characters of reference indicate like parts throughout the different figures.

In the embodiment of the machine illustrated I have provided a base-plate 1 of suitable construction, which base-plate is adapted to carry and support all the operating portions of the machine. The base-plate 1 is provided with a suitable bearing 2, which carries a driving-shaft 3, one end of which driving-shaft is suitably provided with a driving-wheel 4. The driving-wheel is shown as provided with a belt 5, suitably connected to counter-shafting, (not shown,) whereby the same may be driven at the required rate of speed. The said driving-shaft 3 carries a slotted crank-disk 6, which, through the interposition of suitable connecting mechanism, is adapted to effect a reciprocation of the work-holder of the machine carrying the stock or blank material.

The crank-disk 6 is provided with a slot 7, in which a cross-head 8 is adapted to be fixedly secured in any suitable position. The displacement of the said cross-head from the central portion of the said slotted crank-disk—that is, the degree of eccentricity of the said cross-head—governs the amount of movement or throw of the above-mentioned work-holder. The work-holder 9 of the machine carrying the blank or blanks is, as has been stated, actuated by means of the slotted crank-disk.

The cross-head 8 is adapted to slide in a slotted guide 10, which is pivotally secured to the base-frame 1 of the machine by means of a bolt 11. The motion of the slotted guide 10 is transmitted to the work-holder 9 by means of an adjustable connecting-rod 12, pivotally secured both to the work-holder 9 and the slotted guide 10.

Figure 3:
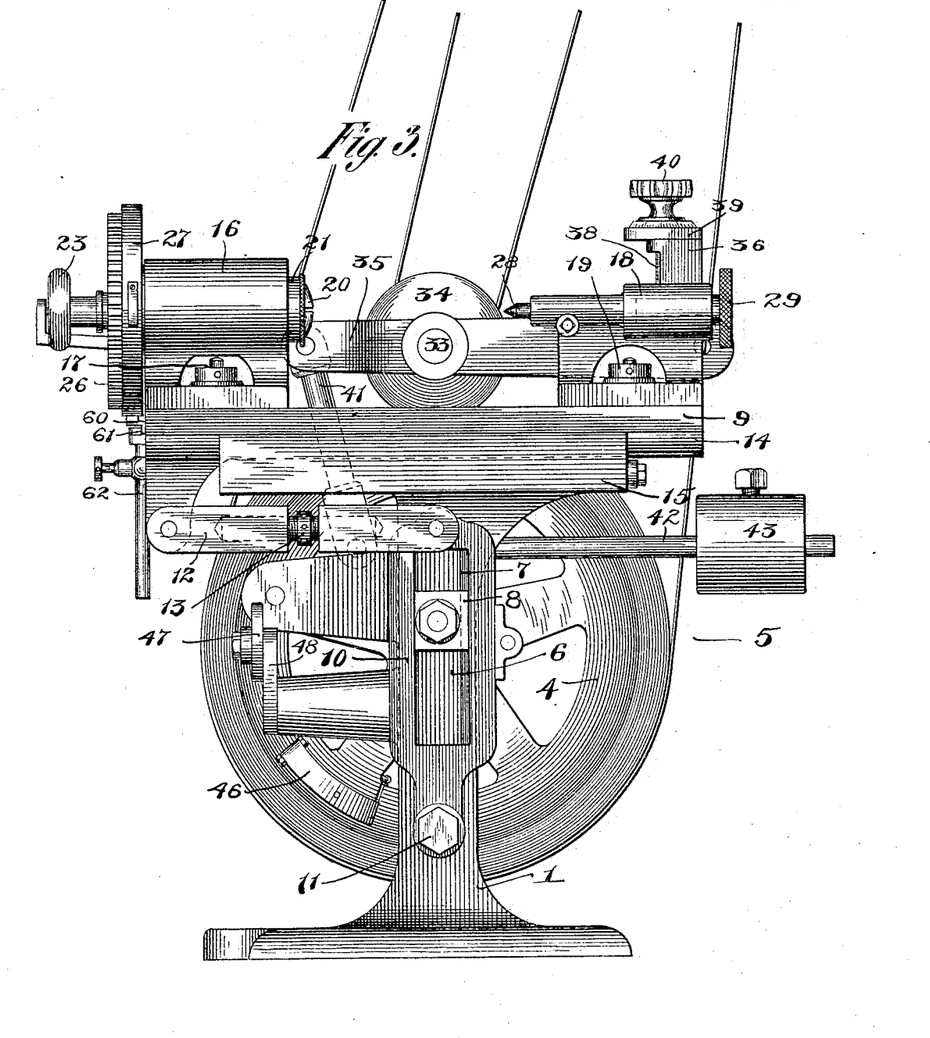
Fig. 3 is a side view looking at the machine in a direction opposite to that of Fig. 1, the feeding mechanism for rotating the stock and the automatic stopping device being omitted for the sake of clearness.
Figure 4:
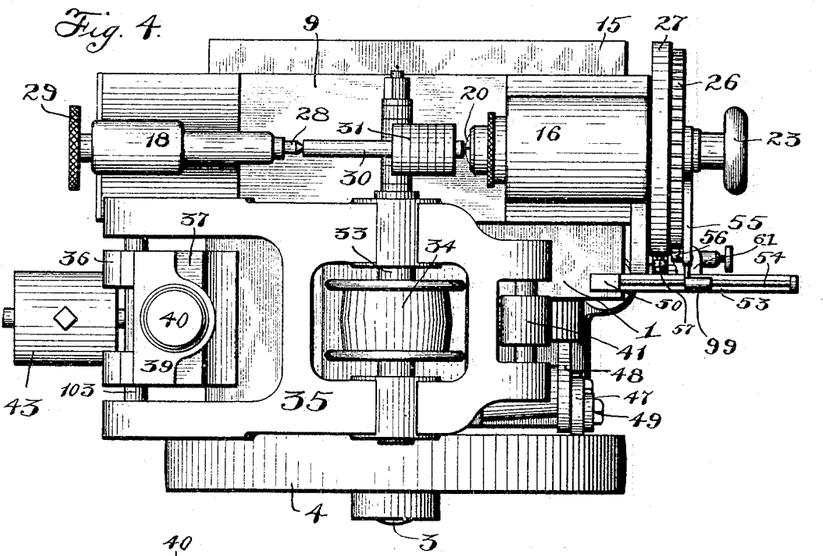
Fig. 4 is a top view of my improved machine.

I prefer to adjust the length of the connecting-rod 12 by means of the double screw 13, which is provided with both a right-hand and a left-hand thread, as shown most clearly in Fig. 3.

It will be seen that the amount of the transverse movement of the work-holder 9 depends upon the displacement of the cross-head 8 from the center line of the shaft 3, and that the position over which the work-holder travels is governed by the length of the connecting-rod 12. The work-holder 9 has a suitable dovetailed base-plate 14, which is adapted to slide in a correspondingly-grooved guide-frame 15, fixedly secured to the base-plate 1 of the machine.

My improved work-holder, to which motion is imparted, as before stated, is provided with adjustable head and tail stocks, which are both adjustably secured to the base-frame 14. The head-stock 16 is secured to the base-plate 14 by means of a nut 17, adapted to engage a screw passing through the said head-stock and dovetailed into the base-plate 14. The tail-stock 18 is preferably similarly mounted upon the base-plate 14 by means of a nut 19. The head and tail stocks are preferably so constructed that they may be raised or lowered through the interposition of suitable liners or by other means, thereby to elevate the work held or carried thereby.

Figures 11, 12, 13:
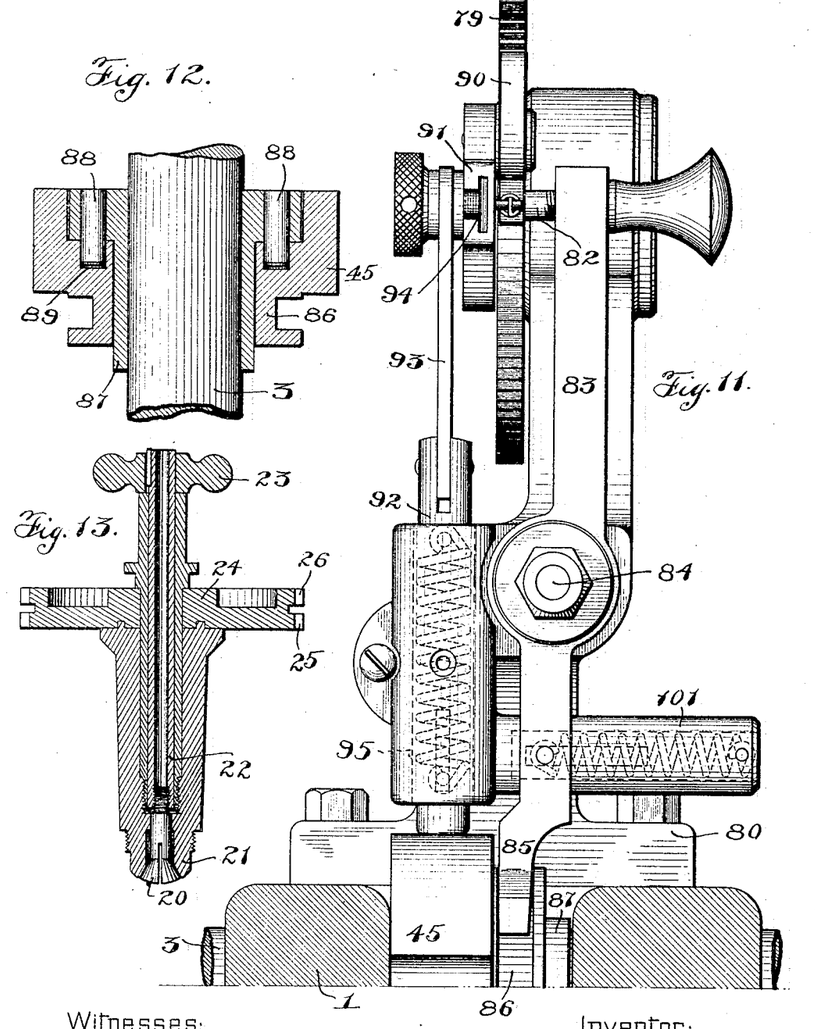
Fig. 11 is a top view of controlling mechanism.
Fig. 12 is a detailed view of the cam-actuating mechanism.
Fig. 13 is a sectional view of the chuck mechanism.

My improved head-stock, through the agency of which I am enabled to securely hold the work in place without the necessity of using elaborate centering devices, is shown more clearly in a detailed view thereof in Fig. 13. As here shown, the chuck portion of the headstock comprises a split sleeve 20, which is suitably fitted into a collar or shell 21 and is held in place therein by means of a threaded stem 22, passing through the shell 21 and having screw-threaded engagement with the split sleeve 20. A handle 23 is provided upon the end of the stem 22 to facilitate its manipulation. The stem 22 serves to draw the split sleeve 20 within the collar 21, thereby to draw together the split portions of the said sleeve and to securely hold in place an arbor or like retaining means employed for holding the work in position. It will be understood, of course, that the arbor is fitted into the central aperture provided in the split sleeve and that the quadrants of the said split sleeve are drawn together and engage the said arbor to retain the same in place. In order to rotate the chuck member of the said head-stock, I prefer to employ an actuating-wheel 24, which is fixedly secured to the collar or shell 21 and which comprises two separate sets of teeth 25 and 26, mounted upon a common web. One set of gear-teeth, in this instance 25, is adapted to be inclosed by a circular shell or housing 27, rigidly held by the head-stock 16, for purposes to be more fully set forth hereinafter. The gear-wheel 26 is adapted to rotate the chuck portion of the head-stock 16, while the gear-wheel 25 is adapted to lock the chuck member in position during the time that the work is operated upon by the tool.

The tail-stock 18 is suitably provided with a centering-shaft 28, which has screw-threaded engagement with the said tail-stock in the usual manner and which is provided with a handle 29, by means of which the same may be screwed into engagement with the arbor or other means for holding the work. The work-holder is shown in this instance as retaining an arbor 30, upon which a plurality of gear-wheel blanks 31 are mounted.

In the operation of my improved machine when the same is used—as, for instance, in cutting gear-teeth upon gear-blanks—I prefer to effect the operations in the following manner: The tool by means of which the cut or incision is to be made in the gear-blank is elevated a slight distance. The work or blank material is thereafter moved transversely across the path of the said operating-tool until the cut is completed, whereafter the operating-tool is again lowered and the work-holder returned to its original position, at the same time preferably being rotated a slight distance, so that at the next forward movement into the path of the cutter a different portion of the blank material will be brought under the influence thereof. To accomplish this, I employ the driving and elevating mechanism, which I will now describe in detail.

The operating-tool 32 is preferably mounted upon a driving-shaft 33, which also carries a driving-pulley 34, suitably provided with a belt engaging counter-shafting of the desired character, which is for the sake of clearness omitted from the drawings. It is of course apparent that by means of the counter-shafting or other suitable means the speed of the driving-pulley 34 may be varied at will, so that the speed of the cutting-tool may be changed as desired. It will furthermore be apparent that the speed of the driving-wheel 4 may also be varied at will, thereby to change the rapidity with which the work is carried across the path of the operating-tool 32.

The operating-shaft 33 is mounted in a swinging frame 35, which is pivotally secured within a sliding block 36. The sliding block 36 is mounted on a vertical standard 37, which is rigidly secured to the base-plate 1 of the machine. The sliding block 36 is adjustably mounted on the standard 37 and suitably movable thereon by an adjusting-screw 38, provided with shoulders which engage a top portion 39, provided upon said block 36. A suitable handle 40 is provided for said screw and graduations marked upon a disk of said handle, whereby it may be possible to elevate or depress the sliding block 36 any desired predetermined amount. The swinging frame 35, which is thus pivotally supported in the sliding block at one end, is supported at the other end by being pivotally connected to a connecting-rod 41, which is at its other extremity pivotally secured to a lever 42, provided at one extremity with a weight 43, the lever being pivoted at the other extremity to the frame of the machine. The lever 42 is moved upwardly and downwardly by means of a triangular projection 44, which is adapted to engage a cam 45, fixedly secured to the operating-shaft 3. A movement of the lever 42 occasioned by a rotation of the cam 45 serves to elevate the connecting-rod 41, and thereby to bring the operating-shaft 33, carrying the operating-tool, into an elevated position, whereby the same is brought into line to operate upon the material held within the work-holder. The cam 45 may be of any desired construction so that the time during which the operating-tool remains in an elevated position may be as desired, either of long or short duration, the movement being preferably such that the operating-tool is elevated into its operating position slightly prior to the time at which the blank material in its forward movement enters into the path of the said tool and is depressed into its lowermost position at a time slightly subsequent to the time at which the work in its forward movement is removed from under the influence of the said operating-tool.

The operation of the machine which I have so far outlined is as follows: The operating-tool is driven at the required speed by means of the pulley 34, and the work-holder 9 is caused to reciprocate by means of the slotted crank-disk 6 and the interposed guide 10 and the connecting-arm 12 when the driving-wheel 4 is suitably rotated by means of the belt. Upon a forward movement of the work-holder, but at a time prior to that at which the work fastened within said work-holder enters within the influence of said operating-tool, the said operating-tool is elevated. Upon a continued forward movement of the work-holder the operating-tool engages the blank material and grooves the same as desired. After the operating-tool has left the blank material the said operating-tool is again lowered as the triangular projection upon the lever 42 engages the receding surface upon the cam 45, whereafter the work-holder is retracted into its original position upon a continued rotation of the driving-wheel 4.

In order to adapt my machine for the operation of cutting gear-wheels, for instance, it is essential that the work be rotated or moved in some manner, so as to present a different portion of its surface to the operating-tool upon a second forward movement of the work-holder. I have provided improved apparatus for accomplishing this result, which apparatus is preferably actuated by means of a cam 46, suitably placed upon the driving-wheel 4. This cam 46 is adapted to engage a cam-roller 47, suitably mounted upon an actuating-bar 48, located sidewise of the machine, which actuating-bar 48 is pivotally secured to the base-plate 1 of the machine by means of the bolt 49. When the cam 46 engages the cam-roller 47, the outermost extremity of the bar 48 is depressed, whereby a lowering of the vertically-movable rod 50 is effected. A shaft 96 is rigidly secured to the bar 50, and thus any motion imparted to the shaft 96 is transmitted to the bar 50. The shaft 96 is pivotally secured to the bar 48 by an adjusting-screw 97. The bar 48 is slotted to permit the adjustment of the length of arm between the stud 49 and the point of connection with the shaft 96. It will be seen that a slight rotary movement of the bar 48 transmits a vertical rectilinear movement through the shaft 96 to the bar 50. The rod 50, which is thus pivotally secured to the bar 48, is provided with a collar 51, whereby the said rod, through the interposition of a suitable spring 52, is adapted normally to remain in its elevated or highest position. The bar 50 has at its upper extremity a horizontally-extending bifurcated end section 53, which supports a bar 54, which bar 54 carries an actuating-detent 99, which engages a recess provided in a pawl-carrying framework 55, loosely mounted upon the head-stock 16 of the machine. The frame 55 carries a pawl 56, which engages with the gear-wheel 26, which pawl when moved by the frame 55 serves to rotate the said gear-wheel, thereby rotating the work or blank material held in the work-holder 9, thus placing a different portion of the work in position to be operated upon by the operating-tool 32.

It is essential that during the time that the work-holder 9 is moving in a forwardly direction, at which time the work is operated upon by the tool 32, suitable means be provided to retain the chuck member of the head-stock 16 in place to prevent the same from rotating. This I preferably accomplish by providing a suitable locking dog or detent 57, which engages teeth of the gear-wheel 25 and which is periodically moved out of engagement with said teeth when a rotation of said gear-wheel is effected by means of the pawl 56. The locking-dog is preferably directly under the control of the work-holder 9 and is so constructed as to be operable upon each forward movement of the work-holder. The means which I prefer to employ to accomplish this comprises a bar 58, pivotally mounted upon the work-holder 9 in line with the teeth of the gear-wheel 25. As has been before stated, the housing 27 is provided about the gear-wheel 25 to prevent dust, filings, grit, or other undesirable material from entering and lodging upon the surfaces of the teeth of the gear within the housing. The locking dog or detent 57, which is mounted upon the bar 58, is adapted to project through a hole 59 in the housing 27 and to engage the teeth of the gear-wheel 25. It is necessary to provide the housing so that the grit does not lodge upon the toothed surfaces in order that the locking dog or detent 57 may at all times engage the surfaces of two adjacent teeth and not be permitted to engage but one and prevented from engaging the other through the interposition of some piece of waste material, in which case the true and accurate angular adjustment of the work in the work-holder would not be affected.

In order to periodically disengage the detent 57 from the teeth 25, I provide a catch 60 upon the lower end of the arm 58, which catch is adapted to engage a tripping device comprising a movable pawl 61, pivotally mounted upon an adjustable arm 62, which in turn is preferably rigidly but adjustably secured to the base-plate 1 of the machine. The position of the pawl 61 may be anything desired so that the same is adapted to trip the catch 60 upon the arm 58 both for short and long strokes of the work-holder 9. The pawl 61, as most clearly shown in Figs. 7, 8, 9, and 10, is so constructed that upon a forward movement of the work-holder 9 the catch 60 engages the pawl 61 and swings the same out of position. Upon a return motion of the work-holder 9, however, the catch 60 engages a rounded surface of the pawl 61, and the detent 57 is thereby swung out of engagement with the teeth 25, whereafter it is possible to rotate said gears, and thereby the blank material mounted in the work-holder 9.

Figures 5, 6, 7, 8, 9:
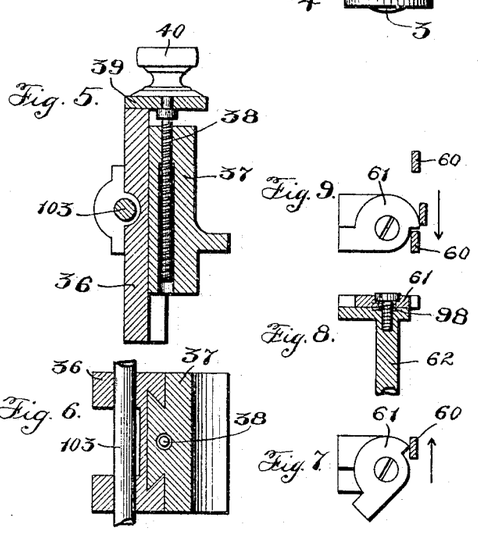
Figs. 5, 6, 7, 8, 9, and 10 are details of construction.
Figure 10:
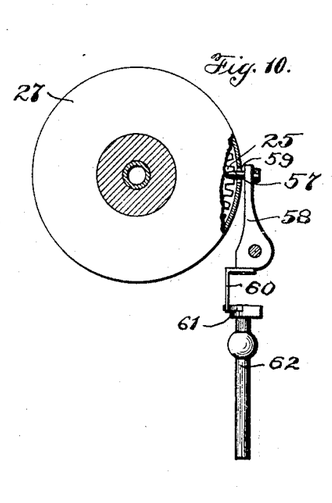

The various positions occupied by the catch 60 in its movement as associated with the pawl 61 are shown most clearly in Figs. 7, 8, and 9. In Fig. 7 I have shown the catch 60 as moving in the direction indicated by the arrow—that is, in a forward direction—while the machine is completing the cut upon the the blank material. In this position the gear-wheels 25 and 26 must be rigidly prevented from rotating and the arm 58 must thus not be moved. In moving, as shown in Fig. 7, the catch 60 strikes the pawl 61 and swings the same so that no angular movement of the bar 58 is effected.

Fig. 8 shows a sectional view of the pawl 61 and the base upon which it is mounted, showing the spring 98, which keeps the pawl 61 in its normal position, as shown in Fig. 9. When the work-holder has completed its forward movement, the catch 60, together with the work-holder, is moved in a backward direction, during which time the feeding mechanism is brought into play to rotate the work. It will be seen more clearly from Fig. 9, in which I have shown three different positions of the catch 60 when the same in the backward movement, which is there indicated by the arrow, approaches the pawl 61, engages the rounded surface thereof, and is rotated outwardly, thus releasing the detent 57 from the gear-wheel 25 and is thereafter released from engagement with the rounded surface of the pawl 61 and drops into the notch provided at the end of this rounded surface. Upon a forward movement of the work-holder, as indicated by the arrow in Fig. 7, it will be seen that no actuation of the arm 58 takes place.

I so regulate the feeding mechanism of my improved machine that during the time at which the detent 57 is released from the path of the gear-wheel 25 the cam 45 engages the cam-roller 47, thus actuating the feeding mechanism, as before stated. When the detent 57 is retracted from engagement with the teeth of the gear-wheel 25, the arm 50 in its upward movement raises the swinging framework 55 and brings the pawl 56 thereof into engagement with another tooth of the gear-wheel 26. When the arm 50 is lowered—that is, when the cam 46 is removed from engagement with the cam-roller 47—the swinging framework 55, together with the pawl 56, rotates the gear-wheel 26 the distance of one tooth or more, as desired. After this rotation of the gear-wheel 26 due to the pawl 56 the detent 57 is again brought into engagement with the teeth of the gear-wheel 25 by reason of the release of the catch 60 from the pawl 61.

The pawl 61 may be constructed of such size that the time during which the locking-dog 57 is out of engagement with the teeth 25 may be of sufficient duration to permit the pawl 56 to rotate the gears 25 and 26 the required amount.

The roller 47 is in this instance shown of considerable size, so that the same will roll gradually off the surface of the cam 46; but other means than employing a large roller may be used in order to impart a gradual motion to the bar 50—such, for instance, as doubly-inclined surfaces of the cam 46 or the like.

It is sometimes of importance to effect the longitudinal adjustment of the shaft so that the operating-tool may be exactly centered with reference to the work upon which it is to operate. Any suitable means may be employed for this result, which may preferably serve to longitudinally displace the framework 35, which for this purpose is suitably mounted upon a shaft 103, along which it may be adjusted and secured in place.

The operation of the machine will now be apparent. Both driving-wheels 34 and 4 are rotated at the desired speed, the operating-tool 32 being mounted upon the driving-shaft 33. The rotation of the wheel 4 causes a forward movement of the work-holder 9 through the interposition of the slotted guide and crank-disk, as before stated. A short time after this forward movement has commenced the operating-shaft 33 is elevated by means of the triangular projection of the lever 42, engaging an ascending surface upon the cam 45, thus placing the operating-tool 32 in position to groove or otherwise cut material which is moved across its path. The forward movement of the work-holder 9 brings the material into the line of the cutting portions of the tool, and this forward movement continues until a groove has been cut through the entire material. Shortly after the operating-tool has operated upon all the material in its forward movement the operating-tool 32 is lowered through the agency of the cam 45 out of the path of the blank material. Shortly prior to the end of the forward movement of the work-holder the catch 60 of the bar 58 engages the pawl 61 and by rotating the same about its pivot has disengaged itself therefrom, whereby it is placed upon the opposite side in such position that upon a reverse movement the arm 58 will be rotated outwardly. The forward movement of the work-holder 9 having been completed, the same is moved in a reverse direction. This reverse movement of the work-holder causes the catch 60 to slide upon the inclined surface of the pawl 61, whereby the bar 58 is rotated outwardly and the detent 57 is brought out of engagement with the teeth of the gear-wheel 25. The locking dog or detent 57 being now out of engagement, whereby the gear-wheel 25 is released, the mechanism for feeding or rotating the chucking mechanism of the head-stock 16 may now be brought into play. This feeding mechanism, which is controlled by the cam 46, causes a depression of the rod 50, whereby the pawl 56 rotates the gear-wheel 26 an amount corresponding to the angular displacement it is desired to give to the work after each forward movement of the work-holder. The rotation of the gear-wheels 25 and 26 having been completed, the locking-dog 57 will again be released by the pawl 61 and permitted to enter the hole 59, provided in the housing 27, there to retain the gears in fixed position during another operation of the tool. The work now being held in fixed position, the work-holder 9 may be again moved forwardly and another operation accomplished by the operating-tool 32. The motion thus outlined may be repeated until the required number of grooves have been cut upon the gear-blank, so that the said blank contains the required number of teeth. It will be apparent that any number of teeth may be cut upon a blank by means of my improved machine.

The number of teeth in the gears 25 and 26 is equal to or is an even multiple of the number of teeth to be cut in the blanks. As the gears 25 and 26 may be interchanged with others having a different number of teeth, means is provided whereby any desired number of teeth may be cut in the blanks.

Figure 1:
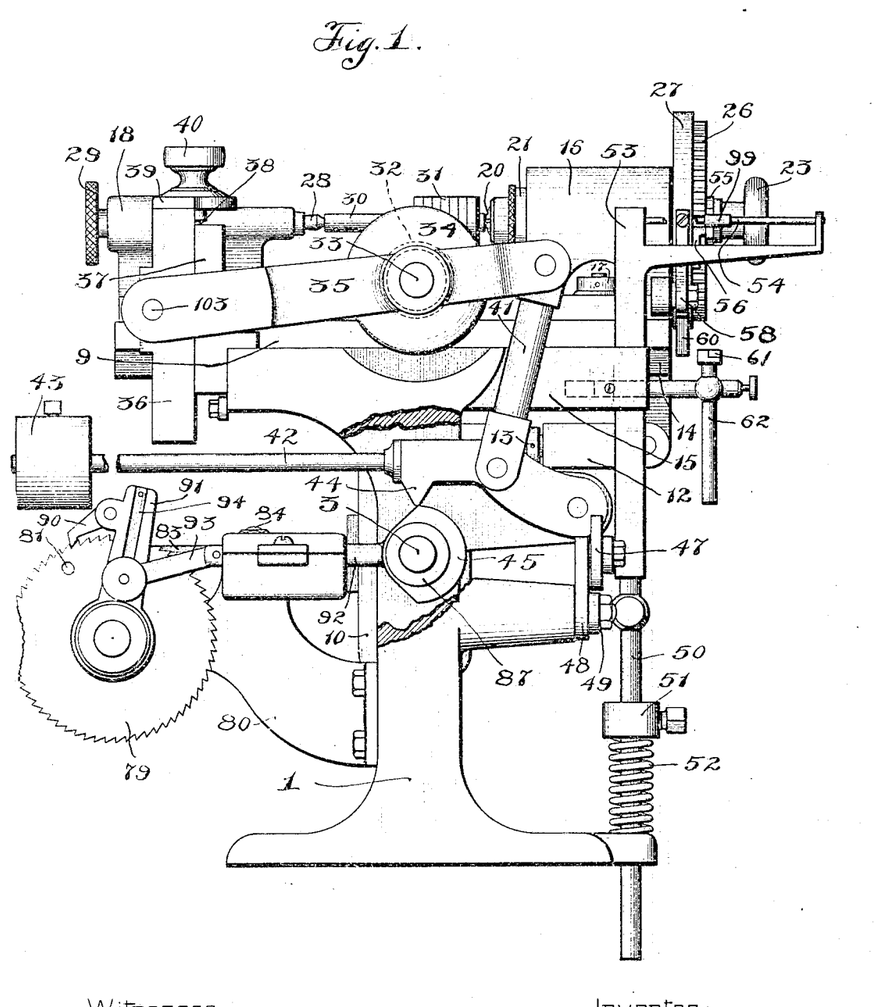
Figure 1 is a side view of the machine, portions of the framework being broken away to more clearly reveal features of construction, the driving-wheel being omitted.
Figure 2:
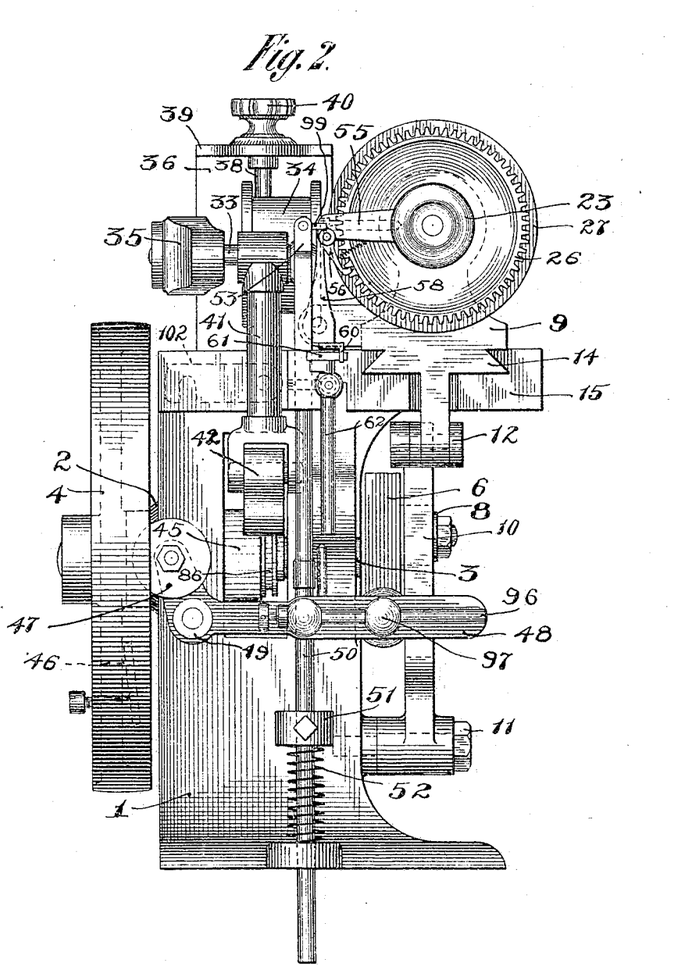
Fig. 2 is an end view of the machine illustrated in Fig. 1.

My invention also contemplates the provision of improved means whereby the machine may be automatically brought to a stop when the required number of operations have been performed—that is, after the requisite number of gear-teeth have been cut. The means which I prefer to employ in this connection consist of a ratchet-wheel 79, mounted upon an extending arm 80, secured to the base-plate 1 of the machine. The ratchet mechanism is more clearly shown in Figs. 1, 11, and 12, to which figures I will more particularly refer in explaining the operation thereof.

The ratchet-wheel is provided with a recess or opening 81, which is adapted when registering with a pin 82 to permit the said pin to enter therein, thereby to permit of the retraction of the arm 83, which arm is pivotally held upon a bolt 84.

The arm 83 is provided, at the other extremity thereof opposite to that which supports the pin 82, with a fork-shaped extension 85, which engages an annular groove provided in a pulley 86, which is securely fastened to the cam 45. The pulley 86, together with the cam 45, is slidably mounted upon a collar 87, fixedly secured to the shaft 3, which collar is provided with hardened-steel pins 88 88. (Shown most clearly in Fig. 12.) Any suitable means may be employed for maintaining the cam 45, together with the pulley 86, out of engagement with the pins 88 when the pin 82 registers with the recess 81, spring-controlled mechanism in a casing 101 being preferably employed for this purpose, which spring actuating mechanism serves to depress the pin 82 into the recess 81. The cam 45 is adapted to rotate with the shaft 3 when the pins 88 of the collar 87 enter recesses 89, provided in said cam 45. When the pins 88 are withdrawn from the recesses 89, the cam 45 is not rotated even though the shaft 3 is revolving. The position of the arm 83 thus regulates the operation of the cam 45, inasmuch as said arm is adapted to withdraw the cam from operative association with the shaft 3 or to retain the same in such operative position. To actuate the arm 83 at the proper time, I employ the pin 82 and recess 81, before mentioned. The ratchet-wheel 79 is preferably actuated to rotate periodically by means of a pawl 90, which pawl is operatively associated with a slotted crank-lever 91, loosely mounted upon the shaft carrying the said ratchet-wheel. The said crank-lever is periodically actuated by the cam 45 in its rotation through the interposition of a plunger 92, which transfers the motion to the crank-lever 91 by means of a connecting-rod 93.

The connecting-rod 93 is adjustable radially in a slot 94, provided in the crank-lever 91, so that the throw of the pawl 90 may be regulated to cause a complete revolution of the ratchet-wheel 79 upon the completion of the required number of strokes of the work-holder. I prefer to employ a spring 95, which normally retains the plunger 92 in engagement with the surface of the cam 45. The manner of operating my improved mechanism will thus be readily apparent.

When the machine is to be started, the pin 82 is removed from the opening 81, provided in the ratchet-wheel 79, thereby bringing the recesses 89, provided in the body portion of the cam 45, in line with the pins 88, which thereupon enter these recesses, and the cam 45 thus continues to rotate with the shaft 3. A single revolution of the cam 45 will move the ratchet-wheel, so that the hole 81 is no longer in alinement with the pin 82. The rotation of the cam 45 will now continue, whereby the operating-tool 32 is raised and lowered to effect its engagement with the blank material. The cam 45 in its rotation not only raises and lowers the operating-tool, but also periodically actuates the plunger 92 to effect a rotation of the ratchet-wheel 79. When the machine has completed the required number of operations, the ratchet-wheel will have completed one complete revolution, whereby the recess 81 is again placed in alinement with the pin 82, thus permitting said pin to drop into said recess, thereby to swing the arm 83 and bring the recesses 89 of the cam 45 out of engagament with the pins 88, whereafter no further rotation of said cam takes place, as the same slides loosely upon the sleeve 87.

Figures 14, 15, 16:
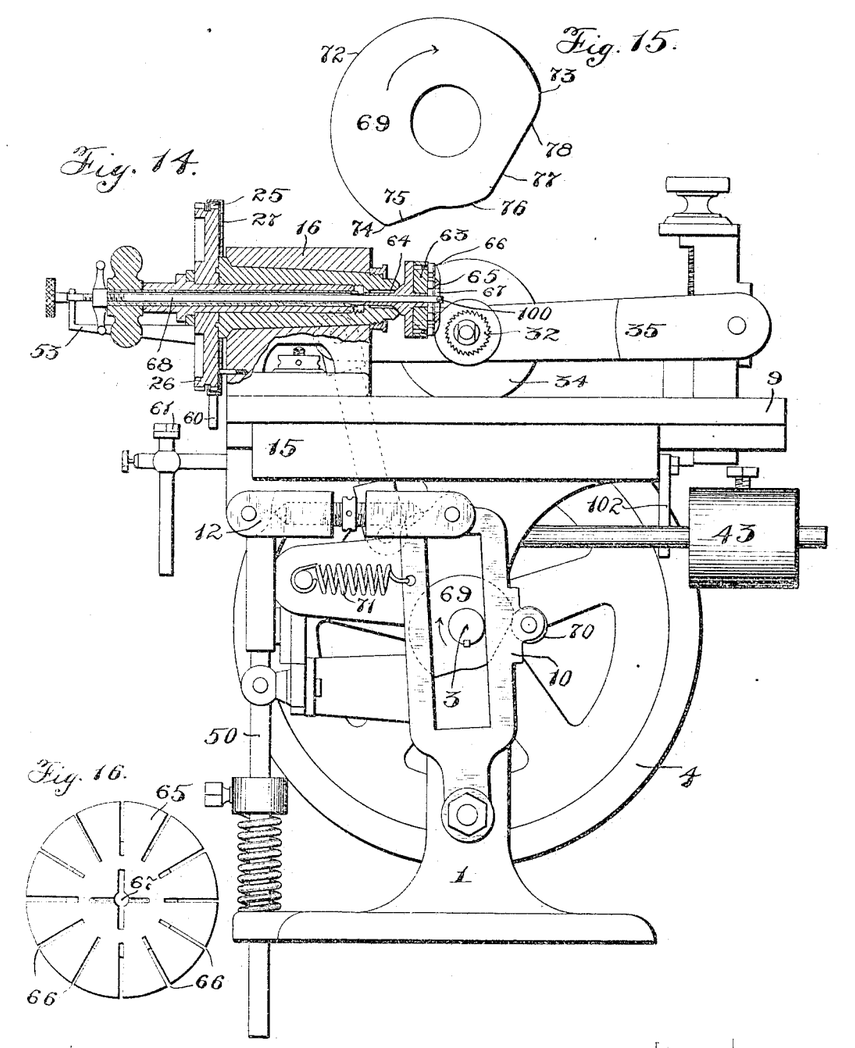
Fig. 14 is a side view of my improved machine when used for a different purpose than that for which the machine in the other figures is used.
Fig. 15 is a cam employed in the operation of the machine when thus changed.
Fig. 16 is a detail of construction.

My invention is also adapted for other uses than cutting gears, and is especially useful in the operation of slotting screws. To this end I employ a suitable supporting-disk 63, within which screws may be placed, as most clearly shown in Fig. 14. I prefer to mount this disk upon a shaft 64, in combination with which I have provided improved means for holding screws in the holes provided in the supporting-disk 63. This means comprises a spider 65, having slots 66 corresponding with the slots which it is desired to cut into the screw-heads, the said spider having a centrally-located slot 67, which is of sufficient size to permit the retaining-bar 68 to pass therethrough, which retaining-bar is rotatably supported within the shaft 64 and which may be fixedly secured therein. The retaining-bar is provided with a transverse pin 100, which passes through the slot 67, which when rotated to a position at right angles no longer registers with the said slot, but rests against the spider 65 to hold the same against the screw-heads when said bar 68 is secured in place. The disk 63 is first mounted upon the shaft 64, whereupon the spider 65 is placed over the same, the bar 68 being then passed therethrough and after being rotated is drawn taut against the said spider 65 and screwed down into position, so that it is impossible for the screws to move. The whole apparatus as thus mounted is suitably placed within the headstock 16 of the machine, the manner in which the screws are successively slotted being substantially as follows:

The operating-tool 32 is continually rotated, but is held in a stationary position, not being elevated or lowered, as is the case, for instance, when cutting grooves in gear-blanks. In order to maintain the shaft of the operating-tool in this fixed position, so that the same is neither raised nor lowered, even though the cam 45 rotates, I employ an arm 102, provided with a catch which may be swung downwardly to engage the shaft of the weight 43, raising the same out of engagement with the cam 45, so that no movement thereof takes place. The work-holder 9 is then moved forwardly into the path of the teeth a distance sufficient to permit the teeth of the operating-tool to cut a groove as deeply as desired, whereupon the work-holder reverses its movement, during which time the supporting-disk 63 may be rotated to bring another screw in position to be operated upon by the operating-tool, and the work-holder is then again moved forwardly to bring the screw within the range of the said operating-tool 32 to be thereafter again retracted and rotated as desired. To accomplish this forward-and-backward movement of the work-holder and at the same time rotate the supporting-disk 63, I prefer to employ a cam 69, which is mounted on the operating-shaft 3, when the machine is to be used for this purpose, as most clearly shown in Fig. 15, which cam then engages a cam-roller 70, provided upon the guide 10, so that by engaging the said roller the cam causes an oscillation of the work-holder 9, as desired, which motion will be more fully set forth hereinafter. It will of course be understood that in this arrangement the connection between the driving-shaft 3 and the frame 10 by means of the cross-head 8 is interrupted, preferably by removing the cross-head, so that the only motion transferred by shaft 3 to the work-holder is through the cam 69. In order to press the cam-roller 70 against the cam 69, a spring 71 is also preferably employed. The movement which the cam 69 imparts to the guide 10, and thereby to the work-holder 9, is as follows: The cam 69 is provided with a surface 72, which gradually recedes from the center line of the shaft on which the said cam is mounted, from the point 73 opposite the direction of the arrow to the point 74. The cam thus serves when said surface 72 is in engagement with the cam-roller 70 to cause a forward movement of the work-holder 9, the rise in the surface 72 from the point 73 to the point 74 being equal to the amount of movement which is necessary to correspond to the correct movement of the work-holder to cut a slot in the screws of the desired depth. A further rotation of the cam 69 brings the cam-roller into engagement with a surface 75, whereby the work-holder is allowed to travel backward a short distance, thus permitting the catch 60 to engage the actuating-surface of the pawl 61, thereby to move the arm 58 outwardly and release the detent 57 from the teeth of the gear-wheel 25, so that a rotation may be effected of the supporting-disk 63 through the agency of the arm 50. This position of the disk is maintained as the cam-roller 70 after engaging the surface 75 engages a circular surface 76, concentric with the center line of the shaft, whereby no movement of the work-holder 9 is effected. After the readjustment of the disk 63 has been effected the cam-roller engages a second receding surface 77, whereby the work-holder is moved backwardly a slight distance more, so that the catch 60 may be released from the rounded actuating-surface of the pawl 61, so that the detent or catch 57 may again engage the teeth of the gear-wheel 25. After this the cam-roller 70 upon a further rotation of the cam 69 comes in contact with a surface 78, extending outwardly to point 73, which surface 78 causes the cam-roller 70 to move the work-holder forward almost within the path of the operating-tool, the movement into the path of the operating-tool being then completed as the cam-roller engages the surface 72.

My invention is especially well adapted to machines intended for work of the utmost mechanical precision and accuracy. I have found that machines of the prior art are defective for such accurate work, for the reason that whether controlled manually or by automatic means the frequent starting and stopping of such machines has caused variations in the temperature of different parts and inaccuracies in the work, due to the consequent expansion and contraction of the parts. It will be seen that my invention provides means whereby the rapidly-moving parts of the machine are kept continuously and constantly in operation at a substantially uniform speed for a great length of time—that is to say, the operative mechanism of a machine constructed in accordance with my invention may be kept continuously in operation during an entire working-day. The swinging frame which carries the rotating milling-cutter permits the movement of the milling-cutter to a place where the work is not engaged thereby. After the completion of the desired number of milling operations—that is, when the desired number of teeth, for instance, have been cut in a gear-blank—the automatic mechanism operates to retain the milling-cutter out of operative association with the gear-blank. Thus the spindle carrying the milling-cutter may be kept continuously in operation, and the mechanism which causes the reciprocation of the work-holding table may be kept continuously in operation, and still the removal of the cutter from a position in which the gear-blank might be engaged thereby prevents any injurious results which might otherwise arise from passing the cutter repeatedly through slots or grooves which had already been milled and cut in the blank. Since the milling-cutter is automatically removed upon a completion of the grooving of a blank, the operator may remove and replace the finished gear with a fresh blank without stopping either the rotation of the cutter or the operation of the mechanism which causes the reciprocation of the work-holder. If, indeed, the operator does find it desirable to stop the reciprocation of the work-holder to replace the finished work, this stoppage is only momentary, the point being that the automatic mechanism which causes the discontinuance of the passage of the cutter through the work does not at the same time cause a discontinuance in the movement of the operative parts of the machine. While my invention thus provides means whereby work of the utmost mechanical precision and accuracy may be performed, still this result is accomplished without resorting to undue complication or multiplicity of parts.

Since the machine of my invention is constructed especially for the purpose of performing the most accurate kind of work, I find it particularly advantageous to inclose the indexing mechanism—in this case the gear 25, as hereinbefore described. The inclosing casing 27 prevents the lodgment of particles of dust or dirt upon or between the teeth of the gear, whereby the proper angular movement of the chuck would be somewhat interfered with.

It is obvious that many changes and modifications may be made of the structures herein shown and specifically described, and I do not, therefore, wish to limit myself to the precise constructions shown; but,

Having thus described my invention, I claim as new and desire to secure by Letters Patent—

1. In a machine of the class described the combination with a main driving-shaft of a reciprocating table, means whereby the rotation of said shaft causes the reciprocation of said table, a head-stock mounted on said table, a spindle rotatably mounted in said head-stock, a toothed index-wheel secured to said spindle, a pawl-carrying frame mounted on the head-stock and concentrically rotatable with respect to said spindle, a pawl carried by said swinging frame adapted to engage the teeth of said index-wheel, a vertically-movable bar 50 carrying a slide-bar 54, said slide-bar lying in the direction of the movement of said table, an actuating-detent 99 on said slide-bar adapted to engage said swinging frame, and cam mechanism associated with said bar 50 and a driving-wheel on said driving-shaft, whereby each revolution of said main shaft causes an actuation of said vertically-movable bar 50 whereby the said swinging frame and the pawl carried thereby are actuated to cause a partial rotation of said index-wheel.

2. In a machine of the class described the combination with a main driving-shaft of a reciprocating table, means whereby the rotation of said shaft causes the reciprocation of said table, a head-stock mounted on said table, a spindle rotatably mounted in said head-stock, a toothed index-wheel secured to said spindle, a pawl-carrying frame mounted on the head-stock and concentrically rotatable with respect to said spindle, a pawl carried by said swinging frame adapted to engage the teeth of said index-wheel, a vertically-movable bar 50 carrying a slide-bar 54, said slide-bar lying in the direction of the movement of said table, an actuating-detent 99 on said slide-bar adapted to engage said swinging frame, cam mechanism associated with said bar 50 and a driving-wheel on said driving-shaft whereby each revolution of said main shaft causes an actuation of said vertically-movable bar 50 whereby the said swinging frame and the pawl carried thereby are actuated to cause a partial rotation of said index-wheel, a second notched index-wheel on said spindle, a locking-detent pivotally mounted on said head-stock and engaging a notch in said index-wheel and an adjustable pawl adapted to trip said detent to disengage said detent from said second notched index-wheel, said locking-detent being disengaged from said index-wheel during the actuation of said vertically-movable bar 50.

3. In a device of the class described the combination with a reciprocating table of a head-stock mounted thereon, a spindle in said head-stock, a main driving-shaft, means actuated from said driving-shaft to cause the reciprocation of said table, means adapted to lock said spindle in said head-stock during the movements of said table in a forward direction, means controlled by the position and movement of said table adapted to unlock said spindle during the movements in the reverse direction, means adapted to cause the step-by-step rotation of said spindle in synchronism with the reciprocations of said table, a pivoted frame, a rotating cutter mounted therein, means for continuously driving said cutter independent of said main driving-shaft, a cam mounted on the main driving-shaft adapted to control said pivoted frame to bring said cutter into operative position during the forward movements of said table and into inoperative position during the reverse movements of said table, means adapted to cause an engagement of said cam by said shaft to cause the rotation of said cam, and means adapted, upon the completion of a predetermined number of oscillations of said pivoted frame, to operatively disengage said cam from said main shaft.

4. In a device of the class described the combination with a continuously-rotating cutter of a continuously-reciprocating work-holder, means for causing a rotary advancement of the work during each backward stroke of said work-holder, means for bringing said cutter into engagement with the work during the forward movements of said work-holder and out of engagement with the work during backward movements of said work-holder, and automatic means for preventing the engagement of said cutter with said work after the completion of a predetermined number of strokes of said work-holder.

5. In a device of the class described the combination with a continuously-rotating cutter of a continuously-reciprocating work-holder, means for causing a rotary advancement of the work during each backward stroke of said work-holder, a main driving-shaft, cam mechanism adapted to be operatively associated with said driving-shaft to bring said cutter into engagement with the work during forward movements of said work-holder and out of engagement with the work during backward movements of said work-holder, and automatic means for destroying the operative association of said cam mechanism with said main driving-shaft to prevent the engagement of said cutter with said work after the completion of a predetermined number of strokes of said work-holder.

6. In a machine of the class described, the combination with a movable work-holder, of an operating-tool, a framework for said operating-tool within which said tool is rotatably mounted, a driving-shaft, cam mechanism interposed between said driving-shaft and said framework for periodically raising and lowering said operating-tool, and automatic means for preventing the engagement of said operating-tool with the work upon the completion of a predetermined number of strokes of the work-holder, substantially as described.

7. In a machine of the class described, the combination with a continuously-movable work-holder, of an operating-tool, a framework for said operating-tool within which said tool is rotatably mounted, independent means for driving the tool, a main driving-shaft, cam mechanism interposed between said driving-shaft and said framework for periodically raising and lowering said operating-tool, and automatic means for preventing the engagement of said operating-tool with the work after a predetermined number of strokes of the work-holder, substantially as described.

8. In a machine of the class described, the combination with a movable work-holder, of an operating-tool, a framework for said operating-tool within which said tool is rotatably mounted, a main driving-shaft, cam mechanism interposed between said driving-shaft and said framework for periodically raising and lowering the operating-tool, and means adapted upon the completion of a predetermined number of oscillations of the tool-supporting frame to operatively disengage said cam mechanism from said main shaft, substantially of described.

9. In a machine of the class described, the combination with a continuously-movable work-holder, of an operating-tool, a pivoted frame within which said tool is rotatably mounted, independent means for continuously driving the tool, a main driving-shaft, cam mechanism interposed between said driving-shaft and said framework for periodically raising and lowering said operating-tool, and means adapted upon the completion of a predetermined number of oscillations of said pivoted frame to operatively disengage said cam from said main shaft, substantially as described.

10. In a machine of the class described, the combination with a continuously-movable work-holder, of an operating-tool, a framework pivoted at one end within which said tool is rotatably mounted, independent means for continuously driving said tool, a main driving-shaft, cam mechanism interposed between said driving-shaft and said pivoted framework for periodically raising and lowering said framework and a tool mounted thereon, means independent of said cam for vertically adjusting the pivoted end of said tool-frame, and means for laterally adjusting the pivoted end of said tool-frame, substantially as described.

11. In a device of the class described, the combination with a continuously-rotating cutter, of a continuously-reciprocating work-holder, ratchet mechanism for causing the rotary advancement of the work during each backward stroke of said work-holder, means for bringing said cutter into engagement with the work during the forward movements of said work-holder and out of engagement with the work during backward movements of said work-holder, additional ratchet mechanism acting in unison with the work-advancing ratchet mechanism for preventing the engagement of said cutter with said work after the completion of a predetermined number of strokes of the work-holder, substantially as described.

12. In a device of the class described, the combination with a continuously-rotating cutter, of a continuously-reciprocating work-holder, ratchet mechanism for causing a rotary advancement of the work during each backward stroke of the work-holder, a main driving-shaft, cam mechanism adapted to be operatively associated with said driving-shaft to bring said cutter into engagement with the work during forward movements of said work-holder and out of engagement with the work during backward movements of said work-holder, additional ratchet mechanism actuated in unison with the work-advancing ratchet mechanism, detent mechanism associated with said additional ratchet mechanism for preventing actuation thereof after a predetermined number of strokes of the work-holder, and further mechanism coöperating with said detent mechanism for withdrawing the cam from operative engagement with the driving-shaft, whereby said cutter is prevented from engaging the work, substantially as described.

13. In a device of the class described, the combination with a continuously-rotating cutter, of a continuously-reciprocating work-holder, ratchet mechanism for causing a rotary advancement of the work during each backward stroke of said work-holder, a main driving-shaft, cam mechanism adapted to be operatively associated with said driving-shaft to bring said cutter into and out of engagement with the work, clutch mechanism for bringing said cam into driving engagement with said main shaft, and means for withdrawing said clutching mechanism upon a predetermined number of strokes of the work-holder, whereby the cutter is prevented from engaging the work, substantially as described.

14. In a device of the class described, the combination with a continuously-rotating cutter, of a continuously-reciprocating work-holder, a pivoted frame in which the said cutter is rotatably mounted, a main driving-shaft, cam mechanism interposed between said driving-shaft and said pivoted frame whereby said cutter is brought into and out of engagement with the work, clutch mechanism for bringing said cam into driving engagement with said shaft, and automatic means for withdrawing said clutching mechanism upon a predetermined number of strokes of the work-holder, whereby said cam is prevented from actuating said pivoted frame supporting said cutter, substantially as described.

15. In a device of the class described, the combination with a continuously-rotating cutter, of a continuously-reciprocating work-holder, advancing mechanism for causing a rotary advancement of the work during each backward stroke of said work-holder, a main driving-shaft, a pivoted frame in which said rotating cutter is mounted, cam mechanism interposed between said pivoted frame and said main driving-shaft, clutch mechanism for bringing said cam into driving engagement with said main shaft, ratchet mechanism actuated in unison with said advancing mechanism, detent mechanism for stopping said ratchet mechanism after a predetermined number of strokes of the advancing mechanism, and further mechanism coöperating with said detent mechanism for withdrawing said cam from driving engagement with said shaft, whereby said cam is prevented from actuating said pivoted frame, substantially as described.

16. In a device of the class described, the combination with a continuously-rotating cutter, of a continuously-reciprocating work-holder, advancing mechanism for causing the rotary advancement of the work during each backward stroke of said work-holder, a main driving-shaft, a cam interposed between said driving-shaft and said cutter whereby said cutter is brought into engagement with the work during forward movements of the work-holder and out of engagement with the work during backward movements of the work-holder, clutch mechanism for bringing said cam into driving engagement with said main shaft, a ratchet-wheel, ratchet mechanism associated with said cam whereby said ratchet-wheel is actuated in unison with said advancing means, detent mechanism for stopping said ratchet-wheel after a predetermined number of strokes of the work-advancing mechanism, and actuating mechanism coöperating with said detent mechanism for withdrawing said cam from driving engagement with said shaft, whereby said cam is prevented from actuating said cutter, substantially as described.

17. In a device of the class described, the combination with a reciprocating work-holder, of a tool, a pivoted frame for supporting said tool, a main driving-shaft, a cam on said shaft coöperating with said pivoted frame to bring said tool into and out of engagement with the work carried by the work-holder, clutch mechanism for bringing said cam into driving engagement with said shaft, and automatic means for withdrawing said clutching mechanism upon a predetermined number of strokes of the work-holder whereby said cam is prevented from actuating the tool-supporting frame, substantially as described.

In witness whereof I hereunto subscribe my name this 11th day of January, A. D. 1902.

FRANKLIN HARDINGE.

Witnesses:
 Charles A. Brown,
 Harvey L. Hanson.